Sept. 9, 1969  Y. CONSEILLER ET AL  3,465,501
PROCESS FOR THE SEPARATION OF MIXTURES OF
ACETYLENE AND VINYL ACETATE
Filed May 16, 1968  2 Sheets-Sheet 1

Inventors
YVON CONSEILLER
MAURICE MAINCON
By
Cushman, Darby & Cushman
Attorneys

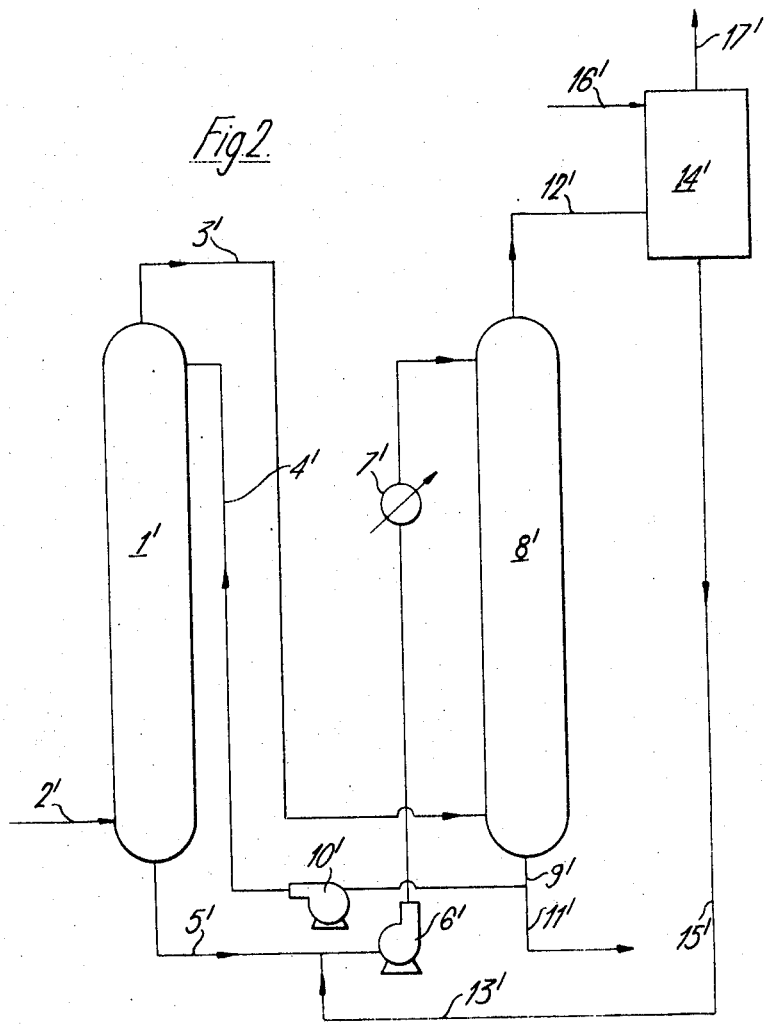

United States Patent Office 3,465,501
Patented Sept. 9, 1969

3,465,501
PROCESS FOR THE SEPARATION OF MIXTURES OF ACETYLENE AND VINYL ACETATE
Yvon Conseiller and Maurice Maincon, Paris, France, assignors to Rhone-Poulenc S.A., Paris, France, a French body corporate
Filed May 16, 1968, Ser. No. 729,821
Claims priority, application France, May 22, 1967, 107,259
Int. Cl. C10h 23/00
U.S. Cl. 55—63     4 Claims

ABSTRACT OF THE DISCLOSURE

Mixtures of acetylene, vinyl acetate and acetaldehyde, especially that derived from the synthesis of vinyl acetate by the vapour phase reaction of acetylene and acetic acid, are economically separated by washing in three successive zones. In the first zone, the hot gaseous mixture passes in countercurrent contact with a liquid mixture of acetic acid, vinyl acetate and acetaldehyde from the second zone. The acetaldehyde is stripped and passes with the gases to the second zone in which it is absorbed by contact with a liquid mixture of acetic acid and vinyl acetate. The liquid from the first zone is recycled to the second zone with the mixture of acetic acid and vinyl acetate from the third zone. The liquid leaving the second zone is partly withdrawn for work up of its acetic acid, vinyl acetate, and acetaldehyde constituents and partly supplied to the first zone. The gas for the second zone is passed to the third zone where it is washed with fresh acetic acid to remove vinyl acetate. Purified acetylene is withdrawn from the third zone.

---

Figure 1:
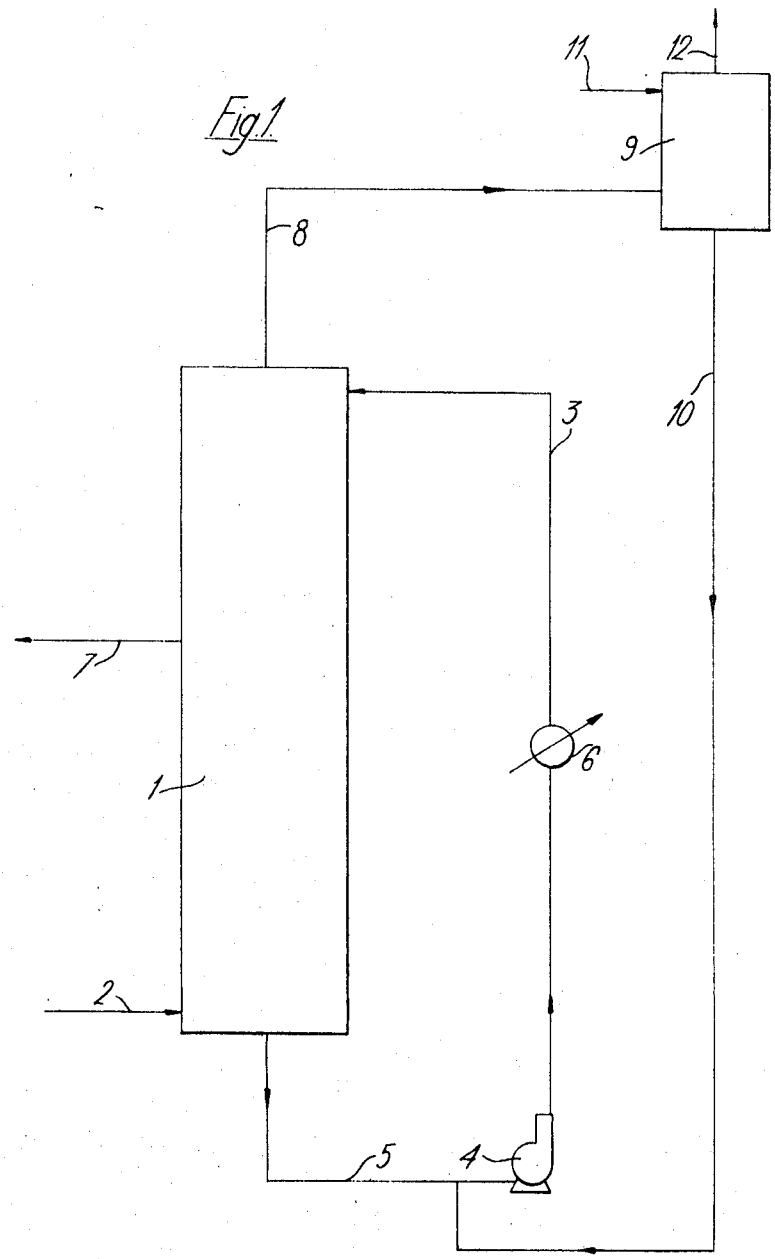

The present invention relates to the separation of mixtures of acetylene and vinyl acetate, especially such mixtures originating from the synthesis of vinyl acetate by vapour phase reaction of acetylene and acetic acid.

When vinyl acetate is synthesized in the vapour phase, by the reaction of acetylene with acetic acid between 100 and 300° C. on an appropriate catalyst, the acetylene is used in excess of the theoretical quantity, and the gaseous mixture obtained contains acetylene (50 to 90% by volume) and acetic acid, in addition to the vinyl acetate, and also various secondary products of the reaction, especially acetaldehyde. The separation of the vinyl acetate which has formed, the recovery of the acetic acid and acetylene, and the elimination of the secondary products from such mixtures, set problems for which the industrial solutions hitherto devised are only partially satisfactory. One of the objectives of particular importance in the treatment of the mixture leaving the reactors is to recover and recycle acetylene which is as pure as possible, and particularly also as free as possible from acetaldehyde.

In general, the constituents of the gaseous mixture other than acetylene (called the condensable products) are first of all condensed to separate therefrom acetylene which is as free as possible from the other products. The condensed mixture is then treated by other means to separate its constituents.

One of the processes for effecting this condensation consists in energetically cooling the mixture of the reaction gases in heat exchangers supplied with ice-cold water and/or brine. As the temperature of the reaction gases is generally between 100 and 300° C., and as it is necessary to cool them to a low temperature, this process involves considerable expense in respect of equipment and loss of heat.

To avoid these disadvantages, it has been proposed in French Patent No. 1,262,345 to cool and condense the condensable products of the reaction gases by direct contact with a liquid mixture cooled to a temperature from −15 to +10° C., formed of a condensate of the actual reaction products or by one or two components of this condensate, the hot gases and the cold liquid circulating in countercurrent. In this process, the reaction gases are sent to the bottom of a column, to the top of which is sent, after previous cooling, part of the condensate collected at the base of the column. A similar process has also been described in Chem. Eng. 63, 288–291 (1956).

Despite the interest which it has by comparison with the indirect condensation process, this process is however still not very satisfactory, both from the point of view of running costs and as regards the content of acetaldehyde remaining in the recovered acetylene.

The present invention provides a new process for the treatment of the reaction gases originating from the vapour phase synthesis of vinyl acetate by the action of acetylene on acetic acid. This new process makes it possible to condense practically all the condensable products and to recover directly, under conditions which are at the same time simple and economic, acetylene which is relatively very pure and in particular contains far less acetaldehyde than does acetylene obtained using the prior condensation processes.

The new process comprises of passing hot impure acetylene containing vinyl acetate and acetaldehyde through the first of three successive zones in countercurrent contact with part of the liquid containing acetic acid, vinyl acetate and acetaldehyde withdrawn from the second zone thereby stripping acetaldehyde present in the said liquid; passing the acetylene containing acetaldehyde from the first zone through the second zone in countercurrent contact with a liquid mixture of acetic acid and vinyl acetate so as to absorb the acetaldehyde therein, the said mixture of acetic acid and vinyl acetate being formed by combination of the acetic acid and vinyl acetate leaving the first zone and acetic acid and vinyl acetate leaving the third zone; passing the acetylene from the second zone through the third zone in countercurrent contact with fresh acetic acid so as to absorb the vinyl acetate therein; withdrawing substantially pure acetylene containing a small amount of acetic acid from the third zone; and withdrawing a liquid mixture of acetic acid, vinyl acetate and acetaldehyde from the second zone.

In this new process, the hot reaction gases are washed, in countercurrent, in an installation comprising three consecutive vertical sections forming two or three separate apparatus. In the first section, the hot gases coming from the vinyl acetate synthesis furnaces enter at the foot and a liquid mixture of vinyl acetate and acetic acid, practically free from acetaldehyde, leaves at the foot. This mixture is recycled to the top of the second section. At the top of the first section, part of the liquid discharged from the bottom of the second section enters. At the base of the second section, the gaseous phase leaving the first section enters and the washing liquid which, at this point, has a high acetaldehyde content (in addition to acetic acid and vinyl acetate) is discharged, part being supplied to the top of the first section and part being drawn off for separation of its constituents. At or near the top of the second section, a mixture of acetic acid and vinyl acetate formed by containing the liquids leaving the bases of the first and third sections enters, and acetylene gas freed from the major part of the acetaldehyde but still containing vinyl acetate leaves. At the bottom of the third section, the gas leaving the second section enters, and acetic acid and vinyl acetate leave. At the top of the third section fresh liquid acetic acid enters and pure acetylene containing a little acetic acid, but practically free from vinyl acetate and acetaldehyde leaves. This gas may be recycled to the vinyl acetate synthesis furnaces.

The temperature of the liquid flowing through the third section, the temperature of the liquid mixture supplied to the top of the second section, the rates of supply of fresh acetic acid to the third section and of the mixture of acetic acid and vinyl acetate to the first and second sections, and also the dimensions of the different sections of the installation are controlled in relation to the temperature and the rate of flow of the gases coming from the synthesis of the vinyl acetate, so as to achieve as great a stripping as possible of acetaldehyde from the washing liquid in the first section and an absorption of this stripped acetaldehyde in the second section, and also an absorption of the vinyl acetate in the third section. At the bottom of the second section, practically all the acetaldehyde and vinyl acetate contained in the reaction gases are drawn off in that part of the discharged liquid which is worked up for separation of its constituents, as is also the major part of the acetic acid provided by the reaction gases and for the washing in the third section. A small part of the acetic acid leaves the third section with the purified acetylene, accompanied by traces of vinyl acetate and acetaldehyde.

The stripping of the acetaldehyde in the first section is the more effective as the washing liquid passing through this section is the hotter. On the other hand, the absorption of the acetaldehyde in the second section is effected the better as the washing liquid is the cooler and at a higher rate of flow. This temperature and rate of flow are controlled taking into account the fact that, for a given rate of flow and temperature of the gases, the rate of flow of washing liquid should be inversely proportional to the interval $t_1-t_2$ between the temperature $t_1$ of the liquid leaving the first section and the temperature $t_2$ of the liquid entering the second section. As a result, the higher the temperature of the gas, the more possible it is to lower $t_2$ while increasing $t_1$, and the more possible it is also to increase the rate of flow of liquid reaching the top of the second section, the consequence being that the content of acetaldehyde is kept low in the gas and the liquid leaving the second and first sections respectively. It is also necessary to note that the choice of the temperatures $t_1$ and $t_2$ is dependent on the concentration of acetic acid in the washing liquid, as these temperatures may be fixed at levels which increase as the concentration of acetic acid of the washing medium increases. As a result, for a given temperature of the synthesis gases to be treated, the higher the concentration of acetic acid in the washing liquid, the more is it possible to increase $t_1$ and thus to assist the stripping, and the easier is it to absorb the acetaldehyde in the second section without having to use too low temperatures, and thus avoid uneconomic cooling of the washing liquid. Finally, it may be noted that in order to absorb the vinyl acetate in the third section, it is necessary to remove, by an appropriate cooling means, the heat generated in this section by the absorption of the vinyl acetate.

In practice, for the gaseous mixtures obtained under the usual conditions for the synthesis of vinyl acetate from acetylene, that is to say, for mixtures which are at a temperature at least equal to 150° C., the new process makes possible a very efficient and very economic absorption of the vinyl acetate and the acetaldehyde, especially if the following conditions are observed: for $t_2$, a temperature generally below 25° C.; for the recycling of washing liquid to the first section, a rate of flow such that the temperature $t_1$ is compatible with stripping of the acetaldehyde; for the composition of the washing liquid in the second section, which consists of acetic acid and vinyl acetate, and a few secondary products, a ratio by weight between acetic acid and vinyl acetate which is between 2:1 and 1:1, and preferably between 1.8:1 and 1.3:1; and for the temperature of the acetic acid supplied to the third section, about 20° C.

In addition, the temperature of the washing liquid supplied to the top of the second section does not generally have to be below 10° C., and in fact usually the mixture of the liquids coming from the bottoms of first and third sections and conveyed to the top of the second section does not have to be cooled below 15° C., this making it possible to use a cooling system which is very simple.

The apparatus making up the different sections can be plate-type columns, packed columns or columns comprising both plates and packing, their dimensions and their arrangement naturally being established, taking into account the rate of flow of gas, so as to obtain contact sufficient to effect the desired purification.

In practice, the new process can be carried out in an installation comprising two successive columns, as shown diagrammatically in FIGURE 1 of the accompanying drawings, the first column serving the purpose of the first and second sections and the second column serving the purpose of the third section. It can also be carried out in a succession of three columns, as shown diagrammatically in FIGURE 2, each column corresponding to one treatment section.

In the apparatus shown in FIGURE 1, the hot gases rich in acetylene and at a temperature which is preferably higher than 150° C., are introduced through a pipe 2 into the base of the column 1. The mixture of washing liquid almost free from acetaldehyde leaving the bottom of the column 1 via pipe 5 and washing liquid leaving the bottom of the column 9 by way of pipe 10, is fed by pump 4 through a cooling condenser 6 to the top of the column 1 via the pipe 3. Through the pipe 7, disposed at an intermediate point of the column 1 such that the liquid drawn off at this point contains the largest possible part of the acetaldehyde contained in the reaction gases, part of the washing liquid is drawn off. This liquid is then treated in an adjoining installation for separation of its constituents especially vinyl acetate and acetic acid. The gases leaving column 1 through the upper pipe 8 are directed to the bottom of the column 9, which is sprinkled with acetic acid supplied via pipe 11. Purified acetylene is withdrawn by pipe 12.

In the apparatus shown in FIGURE 2, the hot gases arrive at the bottom of the column 1', while the liquid mixture with a relatively high content of acetaldehyde withdrawn from the base of the column 8' is supplied to the top of this column 1' by the pump 10' through the conduits 9' and 4'. The gases which leave this first column, containing the acetaldehyde provided both by the hot gases and the liquid coming from column 8', are sent through the conduit 3' to the bottom of the column 8'. A mixture of washing liquid freed from acetaldehyde leaving column 1' through the lower conduit 5' and washing liquid arriving via conduit 15' from the column 14' is supplied by pump 6' to the top of the column 8', after passing through the cooling condenser 7'. Part of the liquid enriched with acetaldehyde leaving column 8' is withdrawn through pipe 11' connected to the lower conduit 9'. The gases leaving the column 8' by way of the upper pipe 12' enter the bottom of the column 14' sprinkled with acetic acid supplied through pipe 16'. Purified acetylene is withdrawn through pipe 17'.

The following example illustrates the invention.

EXAMPLE

The installation used is that which is illustrated diagrammatically in FIGURE 2. Each column, with a diameter of 1.40 m. and a height of 8 m., is packed with Stone Saddles, the characteristics of which are as follows:

Number per cubic metre _____ About 25,100
Weight per cubic metre _____kg__ 560
Specific surface _____m.$^2$/m.$^3$__ 195
Percentage voids _____percent__ 85

Each column also contains a liquid distributor plate every two metres.

Reaction gases, having the composition by weight:

Percent
Acetylene _____ 67.11
Acetic acid _____ 7.42
Vinyl acetate _____ 25.1
Acetaldehyde _____ 0.37 reach the bottom of the column 1' at the rate of 5021.7 kg./hour at a temperature between 160 and 205° C. Reaching the top of this column via the conduit 4' is that fraction of the liquid mixture leaving the column 8' which is maintained in the circuit. It has a temperature of 43° C. and the composition given below.

From the bottom of the column 1', a liquid having a temperature of 57° C. is withdrawn through the conduit 5' at the rate of 23,120 kg./hour. It has the following composition by weight:

| | Percent |
|---|---|
| Vinyl acetate | 37.95 |
| Acetic acid | 62 |
| Acetaldehyde | 0.05 |

To this liquid flow, are added through the conduit 13', 2312.4 kg./hour of liquid coming from the washing column 14', having the composition by weight:

| | Percent |
|---|---|
| Acetic acid | 76 |
| Vinyl acetate | 23.85 |
| Acetaldehyde | 0.15 |

This mixture is supplied by the pump 6' to the heat exchanger 7' in which it is cooled to 20° C., and then introduced into the top of the column 8' at the rate of flow of 25,445 kg./h. The liquid leaving the bottom of the column 8' has a temperature of 43° C. and the following composition by weight:

| | Percent |
|---|---|
| Vinyl acetate | 37.6 |
| Acetic acid | 62 |
| Acetaldehyde | 0.4 |

Part of this liquid (3327.2 kg./hour) is drawn off and sent via 11' into an apparatus in which it is separated into its constituents. The remainder is sent to the top of the column 1' as already mentioned.

The gases leaving the top of the column 8' have the following composition by weight:

| | Percent |
|---|---|
| Acetylene | 84.1 |
| Vinyl acetate | 14 |
| Acetic acid | 1.73 |
| Acetaldehyde | 0.17 |

These gases are sent to the bottom of a washing column 14' having a diameter of 1.40 m. and a height of 8 m., and containing 22 plates distributed over 4.5 metres in its upper part and Stone Saddles in its lower part. Acetic acid at a temperature of 20° C. is introduced at the rate of 1800 kg./hour into the top thereof via conduit 16'. The mixture of acetic acid, vinyl acetate and acetaldehyde, which leaves at the bottom of the column, is added to the cooling liquid, as stated above.

The purified gases leave this last column via conduit 17' at the rate of 3494.5 kg./hour. They have the following composition by weight:

| | Percent |
|---|---|
| Acetylene | 96.4 |
| Vinyl acetate | 0.28 |
| Acetic acid | 3.22 |
| Acetaldehyde | 0.103 |

The balance of the process is illustrated in the following table:

| | Content related to 100 g. of acetylene | | |
|---|---|---|---|
| | Vinyl acetate | Acetic acid | Acetaldehyde |
| In the reaction gases, percent | 37.4 | 11.05 | 0.56 |
| In the gases leaving column (8'), percent | 16.6 | 2.05 | 0.206 |
| After washing with acetic acid in column (14'), percent | 0.29 | 3.3 | 0.103 |

It is thus seen that, without making use of low temperatures, 64% of the initial acetaldehyde is removed in columns 1' and 8' and that this elimination is brought to 82% by the supplementary washing with acetic acid in column 14'. In addition, the vinyl acetate is almost completely condensed.

We claim:
1. Process for the separation of mixtures of acetylene, vinyl acetate and acetaldehyde which comprises: passing a hot gaseous mixture of acetylene, vinyl acetate and acetaldehyde to a first zone; passing the gaseous product of the first zone to a second zone, and the gaseous product of the second zone to a third zone; withdrawing purified acetylene from the third zone; supplying acetic acid as washing liquid to the third zone in countercurrent contact with the gas therein so as to absorb any vinyl acetate contained in said gas; withdrawing a liquid mixture of acetic acid and vinyl acetate from the third zone and supplying it to the second zone in countercurrent contact with the gas therein so as to absorb any acetaldehyde contained in the said gas; withdrawing a liquid mixture of acetic acid, vinyl acetate and acetaldehyde from the second zone, separating part for isolation of its constituents and supplying the remainder to the first zone in countercurrent contact with the hot gaseous mixture therein so as to strip acetaldehyde from the said mixture of acetic acid, vinyl acetate and acetaldehyde; and withdrawing a liquid mixture of acetic acid and vinyl acetate from the first zone and supplying it to the second zone with the liquid mixture of acetic acid and vinyl acetate from the third zone.

2. Process according to claim 1 in which the hot gaseous mixture of acetylene, vinyl acetate and acetaldehyde has a temperature of 150° to 300° C.

3. Process according to claim 1 in which the weight ratio of acetic acid to vinyl acetate in the liquid mixture supplied to the second zone is from 2:1 to 1:1, and the temperature of the said mixture is not more than 25° C.

4. Process according to claim 3 in which the said weight ratio is 1.8:1 to 1.3:1 and the said temperature is 15° to 20° C.

References Cited

UNITED STATES PATENTS

| 3,172,733 | 3/1965 | Karnofsky | 260—498 |
| 3,280,178 | 10/1966 | Barbour | 260—499 |

FOREIGN PATENTS 652,755  11/1962  Canada.

REUBEN FRIEDMAN, Primary Examiner

C. N. HART, Assistant Examiner

U.S. Cl. X.R.

260—498, 499